United States Patent
Tomino et al.

(10) Patent No.: US 6,909,834 B2
(45) Date of Patent: Jun. 21, 2005

(54) MEDIA CONVERTER THAT PROTECTS OPTICAL FIBER CABLE

(75) Inventors: Hiroyuki Tomino, Tokyo (JP); Shuji Tsunoda, Tokyo (JP)

(73) Assignee: Allied Telesis Kabushiki Kaisha, Tokyo (JP)

( * ) Notice: Subject to any disclaimer, the term of this patent is extended or adjusted under 35 U.S.C. 154(b) by 77 days.

(21) Appl. No.: 10/403,113

(22) Filed: Mar. 31, 2003

(65) Prior Publication Data

US 2004/0047581 A1 Mar. 11, 2004

(51) Int. Cl.$^7$ .............................. G02B 6/00; G02B 6/44
(52) U.S. Cl. ..................................... 385/135; 385/103
(58) Field of Search .......................... 385/135, 88, 97, 385/101, 103, 113

(56) References Cited

U.S. PATENT DOCUMENTS

| | | | | |
|---|---|---|---|---|
| 5,434,944 | A | * 7/1995 | Kerry et al. | 385/135 |
| 6,061,492 | A | * 5/2000 | Strause et al. | 385/135 |
| 6,144,792 | A | * 11/2000 | Kim et al. | 385/135 |
| 6,192,180 | B1 | * 2/2001 | Kim et al. | 385/135 |
| 6,314,229 | B1 | * 11/2001 | Sasaki et al. | 385/135 |
| 6,483,978 | B1 | * 11/2002 | Gao et al. | 385/135 |
| 6,621,974 | B1 | * 9/2003 | Chu | 385/135 |
| 6,652,154 | B2 | * 11/2003 | Shirakawa et al. | 385/70 |
| 2002/0150353 | A1 | * 10/2002 | Chiu et al. | 385/88 |
| 2002/0150371 | A1 | * 10/2002 | Battey et al. | 385/135 |

FOREIGN PATENT DOCUMENTS

| | | | | |
|---|---|---|---|---|
| JP | 63-144605 | 9/1988 | | G02B/6/24 |
| JP | 03-24611 | 3/1991 | | G02B/6/38 |
| JP | 3-73901 | 7/1991 | | G02B/6/00 |
| JP | 5-84902 | 11/1993 | | G02B/6/00 |
| JP | 09-197167 | 7/1997 | | G02B/6/24 |
| JP | 10-227925 | 8/1998 | | G02B/6/00 |
| JP | 2001-242323 | 9/2001 | | G02B/6/00 |
| JP | 2001-296432 | 10/2001 | | G02B/6/00 |

OTHER PUBLICATIONS

Fujimoto, "Notice of Reasons for Rejection," Japanese Office Action (in Japanese and English), May 7, 2004, pp. 1–2.

* cited by examiner

*Primary Examiner*—Chandrika Prasad
(74) *Attorney, Agent, or Firm*—Dechert LLP; Leah Sherry

(57) ABSTRACT

It is an exemplified object of the present invention to provide a media converter so shaped that it may prevent damages and disconnections of an optical fiber cable and facilitates handling of the cable. A media converter of one aspect of the invention includes a converter part, connected to a first medium and an optical fiber cable as a second medium, for converting a signal between the first and second media, and an accommodation part for accommodating the optical fiber cable while maintaining a predetermined curvature.

11 Claims, 6 Drawing Sheets

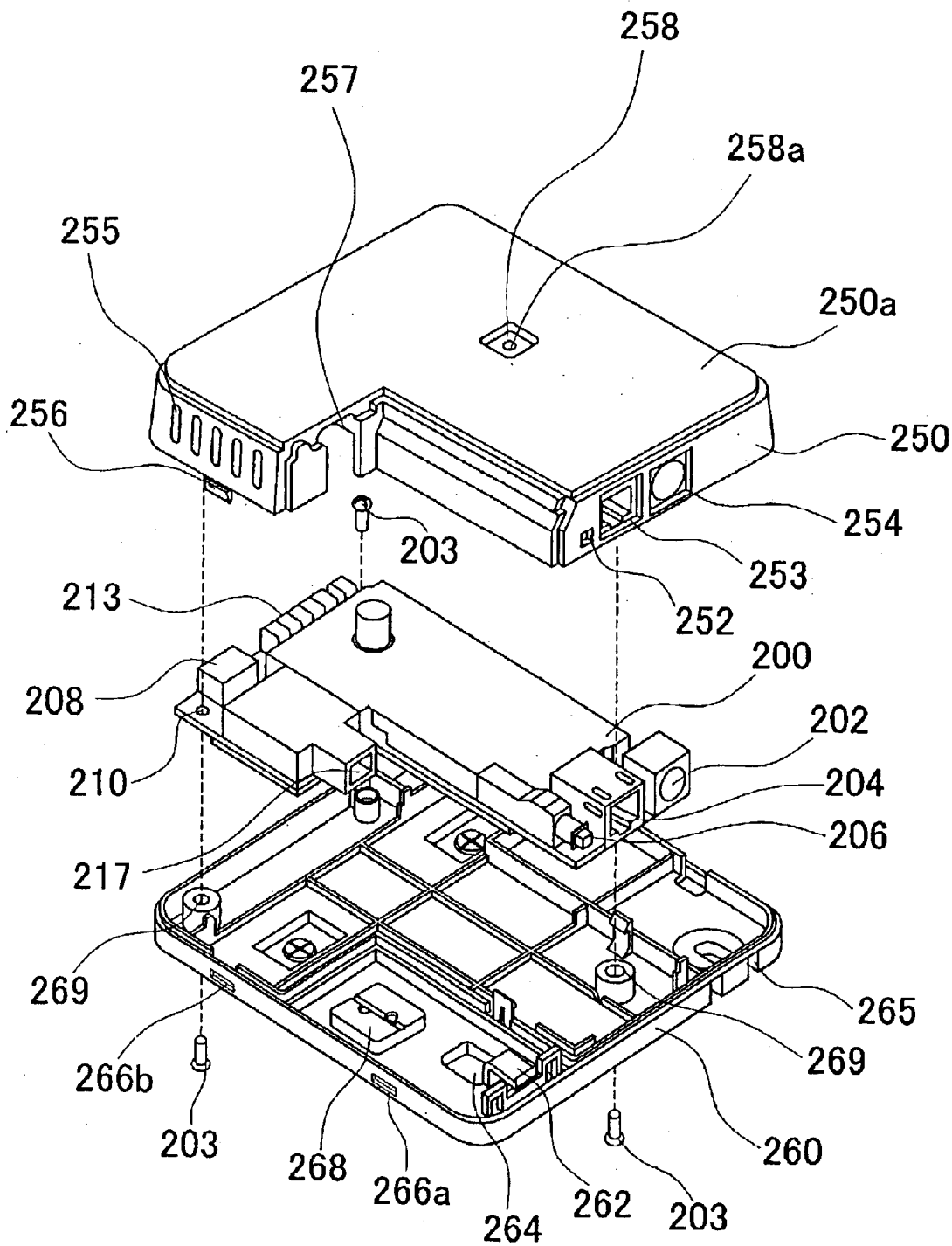
F I G. 2

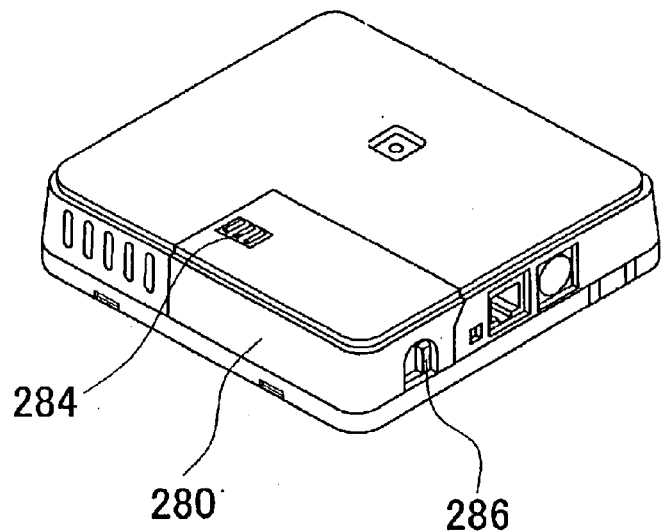
F I G. 5A
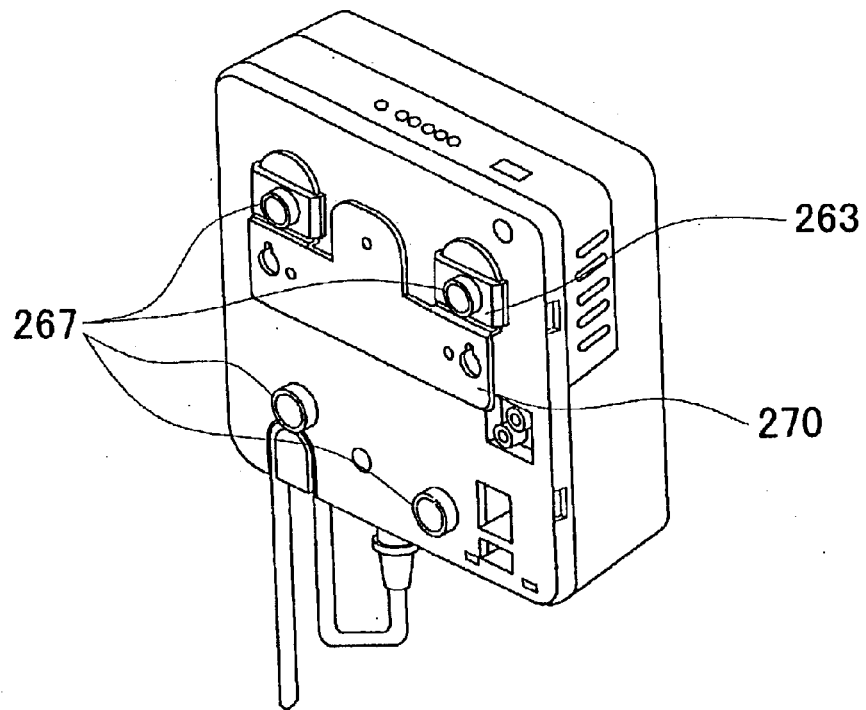
F I G. 5B

MEDIA CONVERTER THAT PROTECTS OPTICAL FIBER CABLE

REFERENCE TO PRIOR APPLICATION

This application is a U.S. counterpart and claiming the benefit of a prior foreign application PCT/JP02/09315, filed in Japan Sep. 11, 2002.

TECHNICAL FIELD

The present invention relates generally to media converters, and more particularly to media converter for connecting a first medium and an optical fiber cable as a second medium and for converting signals flowing between them.

BACKGROUND TECHNOLOGY

Recent developments of information-oriented societies have promoted frequent information transmissions. While the information transmission typically uses transmission media, such as a cable, an optical fiber cable among them has multipurpose utility because it may effectively transmit data over a long distance at a much higher speed than those of conventional pair lines or coaxial metallic cables. The optical fiber cable is a glass or plastic made thin line for transmitting an optical signal, and has a concentric shape in which a clad covers a center core. The optical fiber cable efficiently transmits far away an optical signal enclosed in the core using a difference between core and clad light diffractive indexes and the total reflection.

For example, a high-speed Local Area Network ("LAN") that achieves a base band signal transmission at a transmission speed of 100 Mbps is called the 100 BASE standard, and includes the 100Base-TX and 100 BASE-FX. The 100 BASE-TX uses an Unshielded Twisted Pair ("UTP") cable as a transmission medium, while 100 BASE-FX uses an optical fiber cable as a transmission medium. The optical fiber cable has great utility for providing not only a LAN Ethernet with signal transmissions over several kilometers but also inexpensive Fiber To The Home ("FTTH"). A media converter is usually used to convert a signal between two transmission media. The media converter, as used herein, is a device for converting a signal propagating different transmission media, for instance, an UTP and an optical fiber cable and, and an optical fiber cable (of a single mode) and an optical fiber cable (of a multimode).

It is difficult to handle an optical fiber cable except for engineers. As discussed above, the optical fiber cable is made of such fragile materials as the core and clad, and the curvature less than a permissible value would lessen the transmission capability and damage the optical fiber cable. An engineer usually lays out an optical fiber cable, but general users sometimes have to handle it. For example, once an engineer properly attaches the media converter, a user should take over its handling.

While the optical fiber cable has a standard specified length, the standardized length does not sometimes match a length necessary for a certain service condition. For example, it is conceivable that a user applies an unintentional force to any extra length of the optical fiber cable, thereby bending the cable or damaging a connection between the media converter and the optical fiber cable or undesirably damaging its transmission capability.

It is conceivable to accommodate the optical fiber cable to protect from an external force, but a mere accommodation is not enough and a status of the accommodated cable should be considered. In other words, the accommodated condition must maintain the transmission capability.

In addition, as the recent developments of information-oriented societies have promoted frequent information transmissions not only among companies but also among homes, electronic apparatuses such as a media converter as a transmission apparatus have spread among homes. Since homes require smaller devices than those installed in companies, the device should be made small and shaped to fit a small space in the house.

DISCLOSURE OF THE INVENTION

Accordingly, it is an exemplified object of the present invention to provide a media converter so shaped that it may prevent damages and disconnections of an optical fiber cable and facilitate handling of the cable.

In order to achieve the above object, a media converter of one aspect of the present invention includes a converter part, connected to a first medium and an optical fiber cable as a second medium, for converting a signal between the first and second media, and an accommodation part for accommodating the optical fiber cable while maintaining a predetermined curvature. This media converter integrates the converter part and the accommodation part, preventing a separation between the accommodation part and the converter part during use and disconnections of the OPC due to the external force, in comparison with a structure that separates them from each other. Moreover, an efficient and integral accommodation of them may achieve the miniaturization entirely and facilitate handling.

A drop cable includes the optical fiber cable and a tension member that reinforces strength of the optical fiber cable, and the media converter may further include a fixing part for fixing the tension member. This media converter uses the fixing part to accept the drop cable, and thus split it into the optical fiber cable and the tension member in the media converter. The optical fiber cable is introduced as the drop cable as a whole into the media converter without exposure to the outside, and is protected from the disconnection due to the external force.

Preferably, the media convert further include a lower cover provided with the fixing part; and an upper cover for accommodating the converter part in cooperation with the lower cover, the accommodation part being located on the upper cover. This media converter mounts the accommodation part on the upper cover, making the media converter smaller than that in which the accommodation part is located on the same surface as that of the converter part, and improving the operability of the media converter.

The media converter preferably further includes a positioning mechanism for positioning the accommodation part relative to the upper cover. This media converter fixes an arrangement between the accommodation part and the converter part, and consequently the fixing part and the accommodation part. Thus, no positional offset between the accommodation part and fixing part would cause the curvature of the optical fiber cable to be less than predetermined curvature due to, or the optical fiber cable to get disconnected and broken.

Preferably, the accommodation part is detachably provided on the media converter. Such a media converter may mount the accommodation part depending upon an optical fiber cable's length.

The media converter preferably further includes a protective cover for accommodating the accommodation part. Such a media converter may protect the optical fiber cable from external force, preventing optical fiber cable's disconnections and damage.

Preferably, the lower cover includes a first insertion opening into which the drop cable is inserted, the protective cover includes a second insertion opening into which the drop cable is inserted, and the first and second insertion openings are provided on mutually orthogonal surfaces. Such a media converter may accept the drop cable through insertion openings that are oriented in two different directions, thereby increasing the degree of freedom of installing the media converter.

The accommodation part preferably includes a mechanical splice for splicing two optical fiber cables. Such a media converter uses the mechanical splice to maintain a necessary length for the optical fiber cable and consequently predetermine curvature, thereby preventing disconnection and damage to the optical fiber cable.

A media converter of another aspect of the present invention includes a converter part, connected to a first medium and an optical fiber cable as a second medium, for converting a signal between the first and second media, and a fixing part for fixing a tension member that reinforces strength of the optical fiber cable, a drop cable including the tension member and the optical fiber cable. This media converter integrates the converter part and the fixing part, and thus is made smaller than a structure that separates them from each other.

The media convert preferably further includes a lower cover provided with the fixing part, an upper cover for accommodating the converter part in cooperation with the lower cover, the accommodation part being located on the upper cover, and a protective cover, engaged with the upper and lower covers, for opening and closing the fixing part. This media converter allows the protective cover to open and close, which is necessary for a connection with the drop cable, and eliminates a necessity to disassemble the upper and lower covers so as to improve the operability.

Preferably, the lower cover includes a first insertion opening into which the drop cable is inserted, the protective cover includes a second insertion opening into which the drop cable is inserted, and the first and second insertion openings are provided on mutually orthogonal surfaces. Such a media converter may accept the drop cable through insertion openings that are oriented in two different directions, thereby increasing the degree of freedom of installing the media converter.

The converter part is connectible to a power cable for supplying power to the converter part, and the lower cover includes a stopper for preventing the power cable from pulling off. Such a media converter prevents the power cable from pulling off due to the external force, and maintains stable power supply and signal transmissions.

The converter part preferably has an approximately L-shape, and the lower cover mounts the converter part on the same surface as that of the fixing part and has an approximately square shape. This media converter arranges the fixing part in a space of the L-shaped converter, and makes the lower cover to be an approximately square, maximizing the accommodation space for miniaturization and improving the operability of the media converter.

The media converter preferably further includes an attachment mechanism for attaching the lower cover to an external member. This media converter uses the attachment mechanism to attach the lower cover to a perpendicular wall, partition, etc., increasing the degree of freedom of installing the media converter.

Other objects and further features of the present invention will become readily apparent from the following description of the embodiments with reference to accompanying drawings.

BRIEF DESCRIPTION OF THE DRAWINGS

FIG. 2 is an exploded perspective view among upper and lower covers and a converter part in the media converter shown in FIG. 1.

FIG. 5 is a perspective view for explaining exemplary use of the media converter shown in FIG. 4.

BEST MODE FOR IMPLEMENTING THE INVENTION

Figure 1:
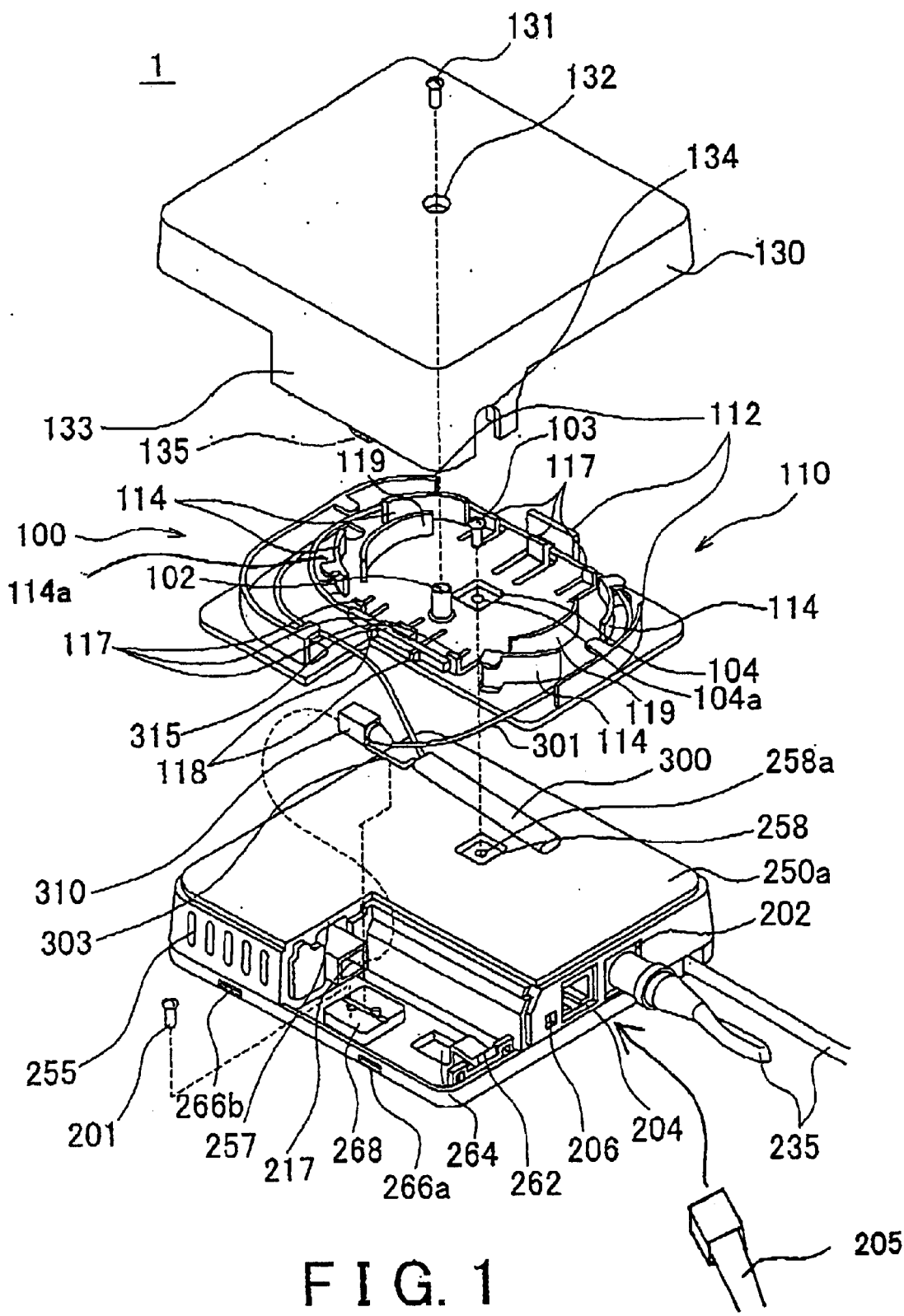
FIG. 1 is an exploded perspective view of a media converter of one embodiment according to the present invention.

A description will now be given of a media converter 1 of one embodiment according to the present invention with reference to the accompanied drawings. Here, FIG. 1 is an exploded perspective view of the media converter 1. FIG. 2 exploded perspective view among upper and lower covers 250 and 260 and converter part 200. The media converter 1 converts a signal between two media, i.e., a UTP 205 inserted into a 100 BASE-TX port 204, which will be described later, and an optical fiber cable 301 included in a drop cable 300. As long as at least one of the media is an optical fiber cable, the present invention does not require the other to be the UTP. For example, the present invention is applicable to a media converter that converts a signal flowing between two optical fibers of a single mode and a multimode.

The media converter 1 includes, as shown in FIGS. 1 and 2, an accommodation part 100, and a protective cover 130, a converter part 200, a power cable 235, an upper cover 250, a lower cover 260, and an attachment mechanism 270. The media converter 1 thus has the accommodation part 100 and the converter part 200, and may prevent a separation between the accommodation part and the converter part during use and disconnections of the OPC 301 due to the external force, in comparison with a structure that separates them from each other. Moreover, efficient and integral accommodations of them may achieve the miniaturization entirely and facilitate handling.

As shown in FIG. 1, the accommodation part 100 serves to accommodate an extra part of optical fiber cable 301 while maintaining its predetermined curvature. The accommodation part 100 is made of plastic, approximately L-shaped, and mounted on a top surface 250a of the upper cover 250. The media converter 1 may be made smaller by mounting the accommodation part 100 on the upper cover 250, than a media converter that arranges the accommodation part 100 and the upper cover 250 on the same surface. As a result, the operability of the media converter 1 may be improved.

The accommodation part 100 includes a fixing part 102, a positioning part 104, a locus arrangement part 110, and a pair of support parts 119. The fixing part 102 has a hollow cylindrical shape having a screw hole in its internal surface, and is engageable with a screw 131 via a center hole 132 in the protective cover 130. A mechanical means may be used to fix the fixing part 102 and protection part 103 with each other instead of the screw 131.

The positioning part 104 serves to position the accommodation part 100 on the upper cover 250 in cooperation with a positioning part 258 in the upper cover 250. Positioning prevents the optical fiber cable 301 from excessively bending, disconnecting and damaging. Although the positioning part 104 is provided near a center of gravity of the accommodation part 100 in this embodiment, its position, size, and the number are not limited. The positioning part 104 has an approximately square shape projecting downwardly, and is engageable with the similarly shaped positioning part 258 as a dent. The positioning parts 104 and 258 have screw holes 104a and 258a, respectively, and the accommodation part 100 is fixed onto the upper cover 250 through the screw 103. A fixture using the screw 103 prevents a positional offset between the accommodation part 100 and the upper cover 250, which would otherwise cause a curvature of the optical fiber cable 301 to be less than the predetermined curvature.

In the alternative embodiment, the positioning part 104 has a concave shape while the positioning part 258 has a convex shape. The fixing means may use adhesives instead of the screw 103. The screw 103 may be adapted to fix unreleasably the accommodation part 100 and the upper cover 250, or the accommodation part 100 may be formed integral to the top surface 250a of the upper cover 250.

The Locus arrangement part 110 defines a locus of the accommodated optical fiber cable 301 so that the optical fiber cable 301 has a curvature of a predetermined curvature or larger. The locus arrangement part 110 includes three outer walls 112, symmetrically arranged four inner walls 114, and mechanical-splice fixing parts 117 and 118. The optical fiber cable 301 is accommodated between the track-shaped outer and inner walls 112 and 114. The radius of curvature 14a of the track shape is set, for example, to be r=30 mm so that the optical cable 301 does not get damaged and disconnected. If necessary, a plurality of curvatures may be prepared and adapted to be replaceable in accordance with the type of the optical fiber cable 301.

The mechanical-splice fixing part 117 includes three attachment parts, while the mechanical-splice fixing part 118 includes two attachment parts. The fixing parts 117 and 118 are provided symmetrical with respect to the positioning part 104. Each of the fixing parts 117 and 118 fixes the mechanical splice 315, which serves to splice two optical fiber cables. For example, when the optical fiber cable 301 is too short to wind around the circumference of the locus arrangement part 110, another optical fiber cable 301 is spliced to maintain the predetermined curvature. The fixing part 117 is formed on the accommodation part 100 so that a notch generates an elastic force for fixing the mechanical splice 315.

A pair of support parts 119 are formed approximately symmetrical to the positioning part 104. The support part 119 reinforces the locus arrangement part 110 in cooperation with the fixing part 102, and protects the optical fiber cable 301 from the external force applied to the center of the protective cover 103.

The protective cover 130 covers the accommodation part 110 from the external force, and serves to prevent the optical fiber cable from getting disconnected and damaged. The protective cover 130 includes, a center hole 132, a protective part 133, an insertion opening 134, and a projection 135. The protective cover 130 is adapted to be releasable from the accommodation part 100 via the screw 131, and the center hole 132 as a screw hole. The protective cover 130 projects at the protection part 133, and other portions retreat to expose the openings 251 to 254 and 259 in the upper cover 250, and radiator hole 255.

The protection part 133 covers the attachment part 262 and the fixing part 268 of the lower cover 260, and protects the drop cable 300 fixed onto the attachment part 262 and the optical fiber cable 301 separated from the fixing part 268. The insertion opening 134 is an opening into which the drop cable 300 is inserted, and provided near the attachment part 262. Thus, this embodiment provides the insertion opening 134 in addition to the insertion opening 264 in the lower cover 260. The insertion openings 134 and 264 that orientate in two different directions to accept the drop cable 300, increasing the degree of freedom of insertion directions for the drop cable 300 and thus the degree of freedom of installing the media converter 1.

The drop cable 300 includes the optical fiber cable 301 and a tension member 303 such as a piano wire. The optical fiber cable 301 is a cable for optical communications and made of a thin fiber composed of a transparent dielectric material, such as glass or plastic. The tension member 303 maintains rigidity of the drop cable 300 and prevents the bending of the optical fiber cable 301. The optical fiber cable 301 structurally includes a core of a large refractive index at its center, and a clad of a small refractive index around the core. An electric signal converted into a light signal propagates through the core while totally reflected due to a difference of refractive indexes between the core/clad boundaries. The optical fiber cable 301 has a multimode that allows multiple modes to be transmitted due to the difference of refractive indexes between the core/clad boundaries and core's diameter, and a single mode that allows only one mode to be transmitted. Advantageously, the optical fiber cable 301 has such small attenuation that it may achieve a long-distance transmission without any interconnecting device. In addition, because of its thin cable diameter and large transmission amount of 100 Mbps to several Gbps, the optical fiber cable 10 has a larger transmission amount per cable's sectional area than that of the metal cable. On the other hand, the optical fiber cable 301 is disadvantageously vulnerable to bending, and damaged by excessive bending. The accommodation part 100 provides the optical fiber cable 301 having such characteristics with an effective extra process, and prevents the optical fiber cable 301 from getting damaged and disconnected, maintaining predetermined transmission performance.

The converter part 200 converts a signal flowing between a first media and the optical fiber cable as a second media. The converter 200 includes a power supply port 202, a 100 BASE-TX port 204, a setup-changing dip switch 208, a MDI/MDI-X switch 206, a perforation 210, LEDs 213, and a 100M-BPS optical port 217. The converter part 200, which has an approximately L-shape, is accommodated in the upper and lower covers and protected from external forces.

The power supply port 202 is a connector connectible to the power cable 235 for supplying power from an adapter (not shown) to a converter part. The 100 BASE-TX port 204 is a connector to be connected to a UTP cable (not shown) that is connected to the converter part 200, such as a hub in the Ethernet. The 100 BASE-TX port 204 has an automatic recognition function of Full Duplex/Half Duplex, and operates in a mode in accordance with the converter part 200 to be connected.

The dip switch 208 sets the communication mode between Full Duplex and Half Duplex, to the same mode as the communication mode of a device connected to the 100M-BPS port 217. The MDI/MDI-X switch 206 is a switch to determine whether the 100 BASE-TX port 212 is used as a cascade connection port or as a normal MDI-X port. The perforation 210 is positioned relative to the lower-cover fixing part 269, into which the screw 203 is inserted. As a result, the converter part 200 is fixed at three positions onto the lower cover 260.

The LEDs 213 are used to confirm a configuration for communications, and include an LED for identifying a link test, an LED for identifying a connection of the 100 BASE-TX port 204, and an LED for identifying the 100 M-BPS optical port 217. The 100 M-BPS optical port 217 is a connector connectible to the optical fiber cable 301. The optical fiber cable 301 in the drop cable 300 is connected, for example, to an optical network. The 100 M-BPS optical port 217 is located at an L-shaped extension of the converter part 200, has the fixing part 268 and provides the media converter 1 with an approximately square shape that facilitates handling.

The upper cover 250 and lower cover 260 serve to protect the converter part 200 from the external force. The upper cover 250 has the openings 251 to 254, 259, radiator holes 255, projection 256, and connection opening 257, and positioning part 258. The openings 251 to 254 and 259 expose the LEDs 213, dip switch 208, 100 BASE-TX port 204, power supply port 202, MDI/MDI-X switch 206.

The radiator holes 255 radiate the heat from the converter part 200. The projection 256 is formed under the radiator holes 255, and engageable with a notch 266b of the lower cover 260 so as to fix the upper cover 250 and lower cover 260. The connection hole 257 exposes 100 M-BPS optical port 217. As described above, the positioning part 258 is formed engageable with the positioning part 104, and fixes and positions the accommodation part 110 relative to the upper cover 250.

The lower cover 260 includes the attachment part 262, a pair of inlet 263, an insertion opening 264, a cable stopper 265, notches 266a and 266b, four support parts 267, and fixing parts 268 and 269.

The attachment part 262 fixes the drop cable 300 with a tie-wrap (not shown), thereby preventing the drop cable 300 from pulling off even when a user accidentally snags the drop cable 300. A pair of inlet parts 263 are provided on the back surface of the lower cover 260, as will be described later with reference to FIGS. 3B and 5B, and form inlets into which an attachment metal fitting 270 is inserted. The drop cable 300 is inserted into the insertion opening 264, as discussed above. The cable stopper 265 is a U-shaped groove for preventing pulling-off of the power cable 265 as discussed with reference to FIG. 3B. A prevention of pulling-off of the power cable 235 may stably supply power. The notch 266a is engageable with the projection 135 of the protective cover 130. The notch 266b is engaged with the projection 256 of the upper cover 250. Four support parts 267 maintain the flatness of the bottom surface of the lower cover 260.

The fixing part 268 fixes the tension member 303 in the drop cable 300 in cooperation with the screw 201. The fixing part 268 accepts the drop cable 300, and allows it to split into the optical fiber cable 301 and tension member converter 1. The drop cable 300 is introduced as a whole to the media converter 1, and the optical fiber cable 301 is not exposed to the outside and is protected from the disconnection due to external forces.

The fixing part 269 serves to fix the converter part 200 onto the lower cover 260 in cooperation with the screw 203. Three fixing parts 269 are provided on the lower part 260, each fixing part having a hollow cylindrical shape and the hollow part serving as a screw hole.

Figure 4:
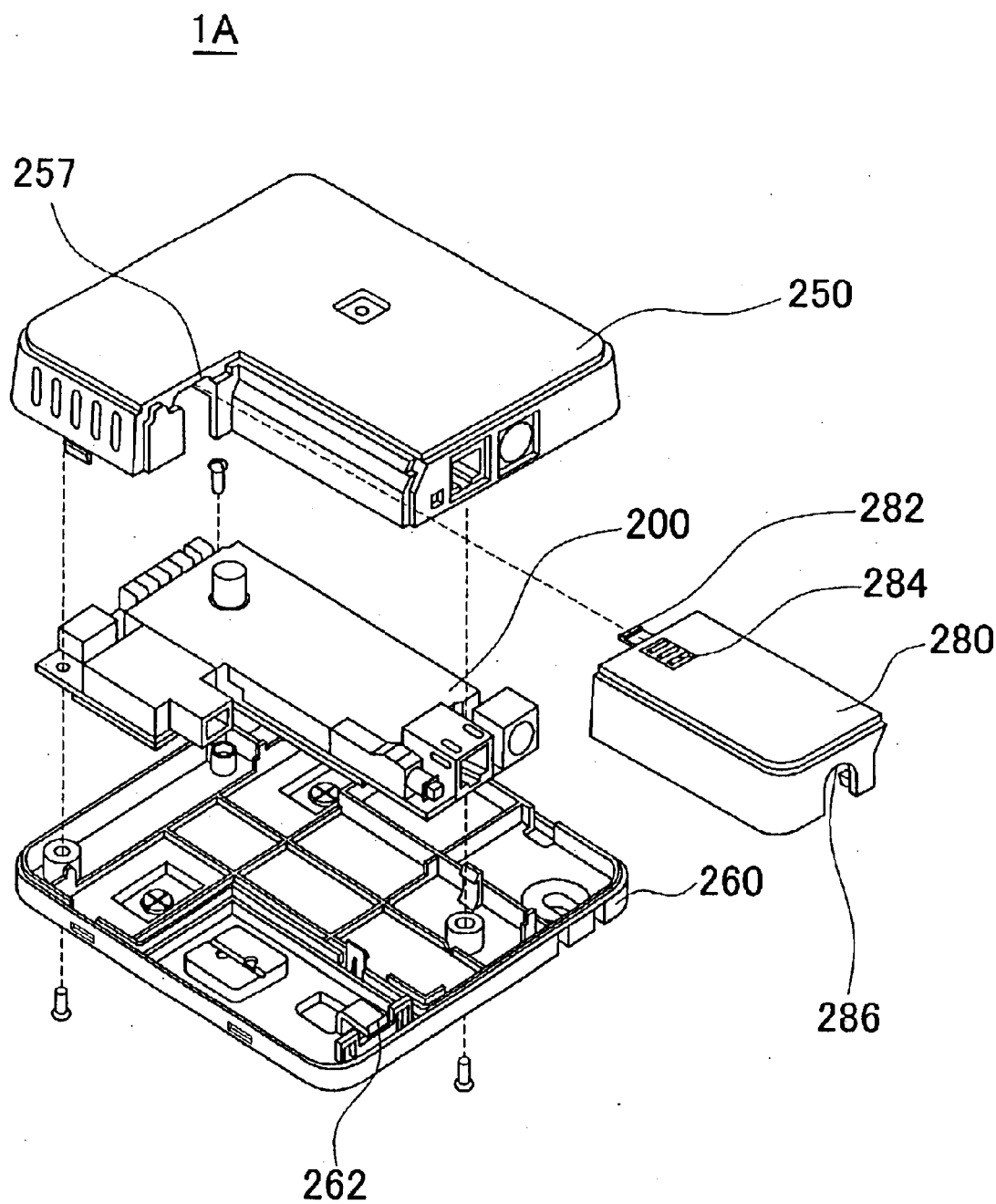
FIG. 4 is an exploded perspective view of a media converter of another embodiment according to the present invention.

A description will now be given of a variation of the media converter 1 with reference to FIG. 4. Here, FIG. 4 is an exploded perspective view of the media converter 1A that does not have the protective cover 130 and accommodation part 100. Those elements in FIG. 4, which are the same elements in FIGS. 1 and 2, are designated by the same reference numerals and thus a description thereof will be omitted.

The media converter 1A has a protective cover 280 in addition to the structure shown in FIG. 2. The protective cover 280 is made, for example, of plastic similar to the upper cover 250, and serves to open and close the 100 M-BPS optical port 217 and fixing part 268. The protection part 280 includes a projection 282 engageable with the connection opening 257 in the upper cover 250, an open/close part 284, and an insertion opening 286. A user uses his thumb to press and slide the open/close part 284 back and forth, so as to open and close the protective cover 280. The open/close part 284 is provided on the top surface of the protective cover 280, and a plurality of line projections at a regular interval with a predetermined length in the open/close direction, enhancing the friction with the user's thumb. The projection 282 is elastically engaged with the connection opening 257 in the upper cover when the protective cover 280 is located at the close position, and this elastic engagement is released when the open/close part 284 is forced to retreat. When the protective cover 280 opens, 100 M-BPS optical port 217 and the terminal 310 is detachably mounted, and the fixing part 268 may fix or unfix the tension member 303. The protective cover 280 eliminates a necessity to disassemble the upper cover 250 from the lower cover 260, facilitating connection work. The protective cover 280 is combined with the L-shaped upper cover 250, and forms an approximately square shape, when viewed from the top, which facilitates handling, as shown in FIG. 5A which will be described later.

In an alternative embodiment, the projection 282 is elastically engaged with the lower cover 260. The upper cover 250 and/or the lower cover 260 may be equipped with one or more rails or guides for sliding the protective cover 280. The open/close part 284 may be provided at the side surface of the protective cover 280. The insertion opening 300 is an opening into which the drop cable 300 is inserted, and provided near the attachment part 262. This embodiment thus provides the insertion opening 300 in addition to the insertion opening 264 in the lower cover 260. The insertion openings that orientate in two different directions accept the drop cable 300, increasing the degree of freedom of insertion directions for the drop cable 300 and thus the degree of freedom of installing the media converter 1A.

Figure 3A:
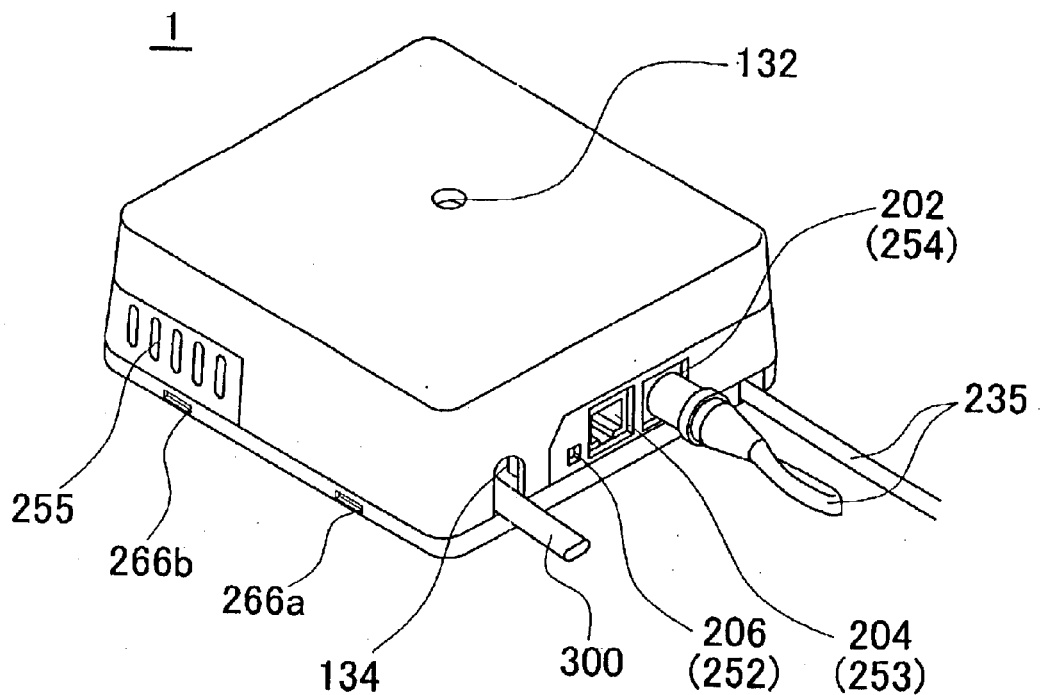
FIG. 3 is a perspective view for explaining exemplary use of the media converter shown in FIG. 1.
Figure 3B:
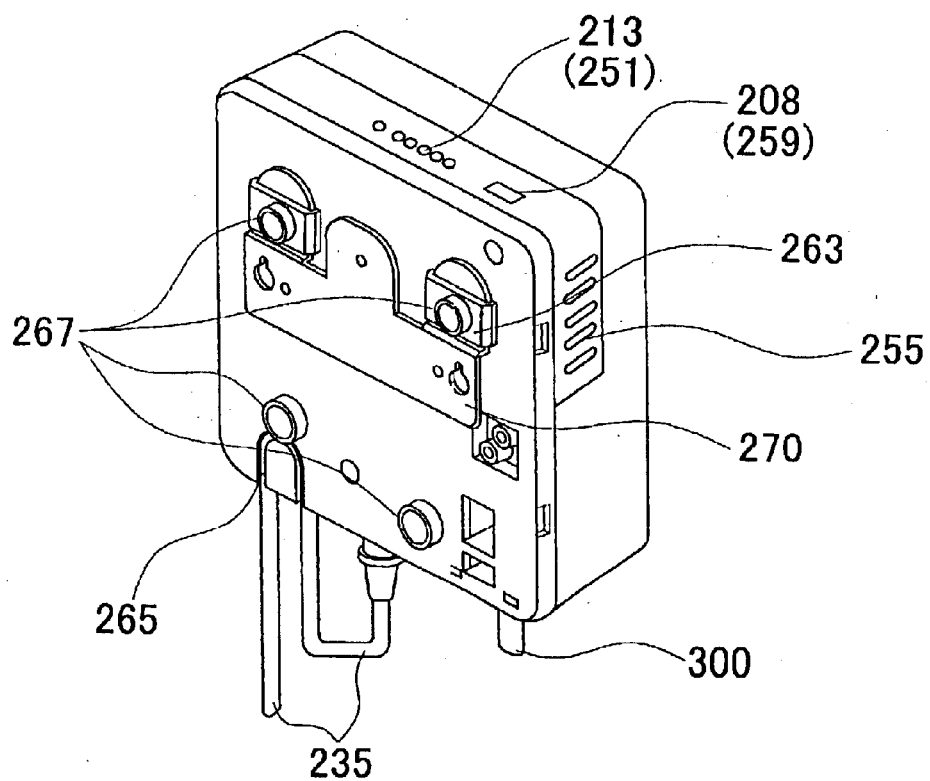

Referring to FIGS. 3 and 5, a description will be given of an attachment of media converters 1 and 1A. Here, FIGS. 3 and 5 are perspective views for explaining the media converts 1 and 1A, respectively, wherein FIGS. 3A and 5A show the media converters 1 and 1A mounted on a horizontal rack, etc. The four support parts 267 provided in the lower cover 260 maintain the flatness of the lower cover 260. FIGS. 3B and 5B show the media converters 1 and 1A attached to a perpendicular surface, such as a wall, partition, etc. using the attachment metal fitting 270.

The wall-hanging metal fitting 270 serves to attach the media converters 1 and 1A to the perpendicular surface. The wall-hanging metal fitting 270 is made, for example, of heat-conductive and rigid stainless, and has a pair of engagement parts 271, a pair of connection parts 273, a base 274, a pair of screw holes 275, an engagement part 276, and three magnet-fixing holes.

The engagement part 272 is connected to the base 274 through the connection part 273 at the back of the base 274, and has a connection hole 272a at its center. Each engagement part 272 exemplarily has a shape of a combination of a semi-circle and rectangle, and inserted into the inlet formed at the inlet part 263 formed on the back surface of the lower cover 260, as shown in FIGS. 3B and 5B. A connection hole 272a in the engagement part 272 engages with the projection (not shown) formed at the side of the lower cover 260 in the inlet part 263. Alternatively, the engagement part 272 may have a projection while the inlet part has a connection hole.

Figure 6:
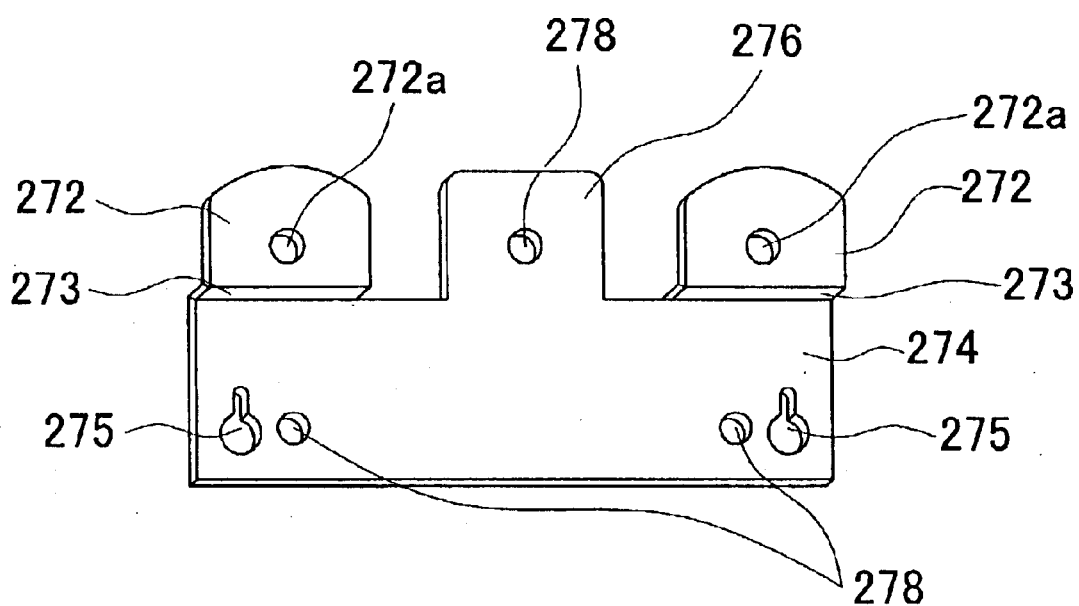
FIG. 6 is an exploded perspective view for explaining an attachment mechanism shown in FIGS. 3 and 5.

The connection part 273 is provided to maintain a space for accommodating a head of a screw (not shown) and the screw hole 275 when the wall-hanging metal fitting 270 is attached to the perpendicular surface, such as a wall, from a back side of the paper of FIG. 6. The connection part 273 also serves as a stopper for supporting the corresponding inlet part 263. In other words, even when the projection formed at the rear surface of the inlet part 263 is pulled out of the connection part 273, the connection part 273 supports the inlet part 263.

The base 274 has a pair of holes 275. The screw is fixed onto the wall (not shown) through each hole 275. The base 274 further has a pair of screw holes 278. The base 274 is made of metal in this embodiment, and magnet's projections are inserted into the three magnet-fixing holes so as to fix the magnets. Three magnets may fix the attachment metal fitting 270 onto a metal surface and other perpendicular surface, such as a partition.

Referring now to FIGS. 1 and 4, a description will be given of a connection between the drop cable 300 and the UTP (not shown). The protective cover 130 is taken away in the media converter 1 shown in FIG. 1, while the protective cover 280 is taken away in the media converter 1 shown in FIG. 1A. Then, the drop cable 300 is fixed onto the attachment part 262 using a tie-wrap (not shown). In any event, it is unnecessary to disassemble the upper cover 250 and lower cover 260 from each other, and thus the work is relatively easy.

The drop cable 300 is delivered out through the insertion openings 134 and 264 in FIG. 1, while the drop cable 300 is delivered out through the insertion openings 264 and 286. The insertion openings 134 and 264 or 264 and 286, which orientate in two different directions, accept the drop cable 300, increasing the degree of freedom of insertion directions for the drop cable 300 and thus the degree of freedom of installing the media converter 1 and 1A.

Then, the tension member 303 from the drop cable 300 is fixed onto the fixing part 268 using the screw 203. In the media converter 1, the optical fiber cable 301 is arranged between the inner and outer walls 112 and 114 in the locus arrangement part 110. The attachment part 262 fixes the drop cable, and the fixing part 268 fixes the tension member 303. As a result, the optical fiber cable 301 is fixed to some extent. The accommodation part 100 is positioned by the positioning part 104 and the positioning part 258 of the upper cover 250, and fixed by the screw 103. Therefore, the bending state of the optical fiber cable 301 is maintained. If necessary, the mechanical splice 315 is fixed at the mechanical-splice fixing part 117, and the optical fiber cable 301 is connected to another optical fiber cable 301. The accommodation part 100 may maintain the predetermined curvature of the optical fiber cable 301. Thereby, the optical fiber cable 301, which is vulnerable to bending, is prevented from getting damaged and disconnected. The media converter 1A does not process the extra length of the optical fiber cable 301. The tip of the optical fiber cable 301 in the media converters 1 and 1A is connected to the terminal 310, which is in turn connected to the 100 M-BPS optical port 217.

In FIG. 1, the media converter 1 is completed by fixing the protective cover 130 onto the fixing part 102 through the screw 131 and engaging the projection 135 with the notch 266a. The optical fiber cable 300 in the accommodation part 100 may be protected from the external force using the protective cover 130. In FIG. 4, the media converter 1A is completed by sliding the open/close part 284 forward using the thumb and engaging the projection 282 with the connection opening 257.

Then, the UTP (not shown) is connected to the 100 BASE-TX port 204. The power cable 235 is connected to the power supply port 202, and to the cable stopper 264. As a result, the converter part 200 is connected to the optical fiber cable 301 and the UTP, and able to convert a signal flowing between them. Thus, the media converter 1 may prevent the optical fiber cable 301 from getting disconnected and damaged, maintain stable signal transmissions, and effectively accommodate the extra length of the optical fiber cable 301. The media converter 1A also prevents the optical fiber cable 301 from getting disconnected and damaged, and maintains stable signal transmissions.

A description will now be given of the operation the media converter 1 and 1A. The dip switch 208 and the MDI/MDI-X switch 222 are manipulated. The communication mode switch 208 may select the Full Duplex (bi-directional simultaneous communication) or the Half Duplex (one-way directional communications). After the UTP cable is connected, the MDI/MDI-X switch 206 provided at the side surface of the media converter 200 selects and sets up the a HUB (for use as a cascade connection port with a repeater or switch) or an XPC (for use as a normal 100 BASE-TX port). The configuration of the media converter 200 may be confirmed using the LEDs 213.

Further, the present invention is not limited to these preferred embodiments, and various variations and modifications may be made without departing from the scope of the present invention. For example, the present invention is applicable to the normal wire LAN system.

Industrial Applicability

Thus, the inventive media converter accommodates the optical fiber cable while maintaining its predetermined curvature. It protects the optical fiber cable from the external force that is otherwise applied to the optical fiber cable, and maintains transmission performance of the optical fiber cable that is vulnerable to bending. The media converter in which the converter part is integrated with the accommodation part may be made smaller than a structure that separates them from each other. Since the optical fiber cable is fixed to some extent when the fixing part is fixed by the tension member, the optical fiber cable is prevented from bending beyond the predetermined curvature during signal transmissions. As a consequence, the optical fiber cable may maintain its good transmission performance.

What is claimed is:

1. A media converter comprising:
   a converter part, configured for connection to a first medium and an optical fiber cable as a second medium, for converting a signal between the first and second media;

a case for accommodating said converter part; and an accommodation part, placed on said case, for accommodating the optical fiber cable and maintaining a predetermined curvature of the optical fiber cable.

2. The media converter according to claim 1, wherein a drop cable includes the optical fiber cable and a tension member that reinforces strength of the optical fiber cable, and said media converter further comprises a fixing part for seperating the tension member from the optical fiber cable and for fixing the tension member, wherein said case includes:

a lower cover provided with the fixing part; and an upper cover for accommodating said converter part in cooperation with said lower cover, said accommodation part being located on said upper cover.

3. The media converter according to claim 2, further comprising a position mechanism for positioning said accommodation part relative to said upper cover.

4. The media converter according to claim 1, wherein said accommodation part is detachably connected to said case.

5. The media converter according to claim 2, further comprising a protective cover for accommodating part said accommodation part.

6. The media converter according to claim 5, wherein said lower cover includes a first insertion opening into which the drop cable is inserted, said protective cover includes a second insertion opening into which the drop cable is inserted, and the first and second insertion openings are provided on mutually orthogonal surfaces.

7. The media converter according to claim 1, wherein said accommodation part includes a mechanical splice for splicing two optical fiber cables.

8. The media convert according to claim 5, wherein:

said protective cover is engaged with the upper and lower covers, and exposes and shields the fixing part.

9. The media converter according to claim 2, wherein said converter part is connectible to a power cable for supplying power to said converter part, and said lower cover includes a stopper for preventing the power cable from pulling off.

10. The media converter according to claim 2, wherein said converter part has an approximately L-shape, and said lower cover mounts said converter part on the same surface as that of said fixing part and has an approximately square shape.

11. The media converter according to claim 2, further comprising an attachment mechanism for attaching said lower cover to an external member.

* * * * *